(12) United States Patent
Gibson et al.

(10) Patent No.: US 10,155,512 B2
(45) Date of Patent: Dec. 18, 2018

(54) METHODS AND SYSTEM FOR OPERATING A HYBRID VEHICLE IN CRUISE CONTROL MODE

(71) Applicant: Ford Global Technologies, LLC, Dearborn, MI (US)

(72) Inventors: Alexander O'Connor Gibson, Ann Arbor, MI (US); James William Loch McCallum, Ann Arbor, MI (US); Felix Nedorezov, Rochester Hills, MI (US); Xiaoyong Wang, Novi, MI (US); Matthew John Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 15/376,428

(22) Filed: Dec. 12, 2016

(65) Prior Publication Data
US 2017/0088123 A1    Mar. 30, 2017

Related U.S. Application Data

(63) Continuation of application No. 14/522,199, filed on Oct. 23, 2014, now Pat. No. 9,517,764.

(51) Int. Cl.
*B60W 20/40* (2016.01)
*B60W 30/14* (2006.01)
(Continued)

(52) U.S. Cl.
CPC .............. *B60W 20/40* (2013.01); *B60K 6/48* (2013.01); *B60L 11/14* (2013.01); *B60L 11/1861* (2013.01); *B60W 10/02* (2013.01); *B60W 10/06* (2013.01); *B60W 10/08* (2013.01); *B60W 10/10* (2013.01); *B60W 20/10* (2013.01); *B60W 30/143* (2013.01); *B60W 40/105* (2013.01); *B60W 50/06* (2013.01); *B60K 2006/4825* (2013.01); *B60L 2240/12* (2013.01); *B60L 2240/507* (2013.01); *B60W 2510/0208* (2013.01); *B60W 2520/10* (2013.01); *B60W 2540/00* (2013.01); *B60W 2600/00* (2013.01); *B60W 2710/021* (2013.01);
(Continued)

(58) Field of Classification Search
CPC ...... B60W 20/40; B60W 10/02; B60W 10/06; B60W 10/08; B60W 10/10; B60W 20/10; B60W 30/143; B60W 40/105; B60W 50/06; B60W 20/15; B60K 6/48; B60L 11/14; B60L 11/1861
See application file for complete search history.

(56) References Cited

U.S. PATENT DOCUMENTS

| 6,390,948 B1 | 5/2002 | Jain et al. |
| 7,099,757 B2 | 8/2006 | Niki et al. |

(Continued)

*Primary Examiner* — Nicholas Kiswanto
(74) *Attorney, Agent, or Firm* — David Kelley; McCoy Russell LLP

(57) ABSTRACT

Systems and methods for reducing driveline mode change busyness for a hybrid vehicle are presented. The systems and methods may delay a driveline mode change in response to a time since a change from a first desired vehicle speed to a second vehicle speed, or alternatively, driveline mode changes may be initiated in response to an estimated time to change from the first desired vehicle speed to the second desired vehicle speed.

7 Claims, 7 Drawing Sheets

(51) Int. Cl.
*B60W 40/105* (2012.01)
*B60W 10/10* (2012.01)
*B60W 10/06* (2006.01)
*B60W 10/08* (2006.01)
*B60W 50/06* (2006.01)
*B60K 6/48* (2007.10)
*B60W 10/02* (2006.01)
*B60W 20/10* (2016.01)
*B60L 11/14* (2006.01)
*B60L 11/18* (2006.01)

(52) U.S. Cl.
CPC . *B60W 2710/06* (2013.01); *B60W 2710/0644* (2013.01); *B60W 2720/103* (2013.01); *B60Y 2300/143* (2013.01); *B60Y 2300/91* (2013.01); *B60Y 2400/112* (2013.01); *B60Y 2400/48* (2013.01); *Y02T 10/6221* (2013.01); *Y02T 10/6252* (2013.01); *Y02T 10/6286* (2013.01); *Y10S 903/93* (2013.01)

(56) References Cited

U.S. PATENT DOCUMENTS

| | | | |
|---|---|---|---|
| 7,194,993 | B2 | 3/2007 | Lewis et al. |
| 7,370,715 | B2 * | 5/2008 | Colvin ............ B60K 6/48 |
| | | | 180/65.28 |
| 8,498,795 | B2 | 7/2013 | Eriksson et al. |
| 8,521,377 | B1 | 8/2013 | O'Leary et al. |
| 8,740,744 | B2 | 6/2014 | Grutter et al. |
| 9,008,935 | B2 | 4/2015 | Konishi |
| 9,751,521 | B2 * | 9/2017 | Schwartz ......... B60W 10/10 |
| 2007/0278022 | A1 * | 12/2007 | Tanishima ....... B60K 6/383 |
| | | | 180/65.285 |
| 2010/0198450 | A1 * | 8/2010 | Shin ................ B60W 30/14 |
| | | | 701/31.4 |
| 2011/0276216 | A1 | 11/2011 | Vaughan |
| 2013/0245912 | A1 | 9/2013 | Boot |
| 2013/0311024 | A1 * | 11/2013 | Tagawa ............ B60K 6/445 |
| | | | 701/22 |
| 2014/0371964 | A1 * | 12/2014 | Kitahata .......... B60K 6/445 |
| | | | 701/22 |
| 2015/0232094 | A1 | 8/2015 | Sudou et al. |
| 2015/0314775 | A1 | 11/2015 | Dextreit et al. |

\* cited by examiner

METHODS AND SYSTEM FOR OPERATING A HYBRID VEHICLE IN CRUISE CONTROL MODE

CROSS REFERENCE TO RELATED APPLICATION

The present application is a continuation of U.S. patent application Ser. No. 14/522,199, entitled "METHODS AND SYSTEM FOR OPERATING A HYBRID VEHICLE IN CRUISE CONTROL MODE," filed on Oct. 23, 2014, the entire contents of which are incorporated herein by reference for all purposes.

FIELD

The present description relates to methods and a system for reducing mode change busyness of a hybrid vehicle. The methods may be particularly useful for hybrid vehicles that include a driveline disconnect clutch, engine, and driveline integrated starter/generator.

BACKGROUND AND SUMMARY

A hybrid vehicle may include a driveline that operates in a plurality of modes to improve driveline efficiency. In one example, the hybrid driveline may include an engine, driveline disconnect clutch, and driveline integrated starter/generator (DISG). The engine and DISG may selectively provide torque to the hybrid driveline. In one mode, the engine may be decoupled from the DISG so that the DISG may propel the hybrid vehicle without having to expend energy rotating the engine when the engine is not combusting an air-fuel mixture and providing torque to the driveline (DISG only mode). In another mode, the engine may provide torque to propel the vehicle when the DISG is not providing torque to the driveline or absorbing torque from the driveline (engine only mode). In still another mode, the engine and DISG may both provide torque to propel the vehicle (DISG/engine mode). Thus, the hybrid driveline may operate in a plurality of modes based on vehicle operating conditions.

The same driveline modes may be made available when the hybrid vehicle is operating in a cruise or speed control mode. The vehicle may enter speed or cruise control mode when prompted to do so by a driver or a controller. The driver or controller selects a desired vehicle speed, and torque supplied to the vehicle's wheels is adjusted to maintain vehicle speed within a threshold speed of the desired speed. Actual vehicle speed as determined from output of a wheel speed sensor or driveline speed sensor may be used as feedback to control vehicle speed. The actual vehicle speed may be subtracted from the desired vehicle speed to determine a vehicle speed error. The vehicle speed error may be multiplied by a gain or controller transfer function to provide a driveline torque adjustment. The driveline torque adjustment may be output to the engine and/or the DISG which supply torque to the driveline so that vehicle speed converges to the desired vehicle speed.

Engine and/or DISG torque may be continuously adjusted to achieve the desired vehicle speed during speed control mode since driveline torque to maintain the desired vehicle speed may change with varying road conditions including road grade. Additionally, a driver or controller may adjust the desired vehicle speed depending on vehicle and/or road conditions. For example, a driver may reduce a desired vehicle speed while the vehicle is in speed or cruise control mode in response to entering a road construction zone. Similarly, the driver may increase the desired vehicle speed in response to exiting the road construction mode. The change in desired vehicle speed may initiate a change in engine and/or DISG requested torque so that the vehicle converges to a new desired vehicle speed. However, the change in requested driveline torque may initiate an engine stop or start (e.g., a change in driveline operating mode) that may be undesirable since the engine may be restarted only a short time after it is stopped to propel the vehicle at the new desired vehicle speed. Further, the driveline disconnect clutch may be opened and then closed shortly thereafter to change driveline operating modes and provide the desired new vehicle speed. Frequent changes in driveline modes (e.g., driveline mode change busyness) may reduce driveline durability and disturb the vehicle's passengers. For these reasons, it may be desirable to provide a method and system that may reduce driveline mode changes during a vehicle cruise or speed control mode.

The inventors herein have recognized the above-mentioned disadvantages and have developed a method, comprising: during a closed-loop vehicle speed control mode, delaying a change in propulsion sources providing torque to a driveline or absorbing torque from the driveline in response to an amount of time since a change in a desired vehicle speed.

By delaying a driveline mode change in response to an amount of time since a change in a desired vehicle speed was initiated, it may be possible to provide the technical result of avoiding driveline mode change busyness that may be present in vehicle systems that use torque demand as a primary driveline mode change variable. For example, a driveline mode change may be delayed a predetermined amount of time since a change in desired vehicle speed. Consequently, even if there would be a large change in desired driveline torque, wheel torque, or transmission input shaft torque, the driveline may not immediately switch operating modes. Consequently, the driveline may switch between modes less often when the vehicle is operated in a closed-loop vehicle speed control mode.

The present description may provide several advantages. In particular, the approach may reduce the possibility of disturbing a driver due to frequent driveline mode changes. Additionally, the approach may reduce the possibility of driveline component degradation. Further, the approach may improve vehicle fuel economy via reducing unnecessary driveline mode changes. The described advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
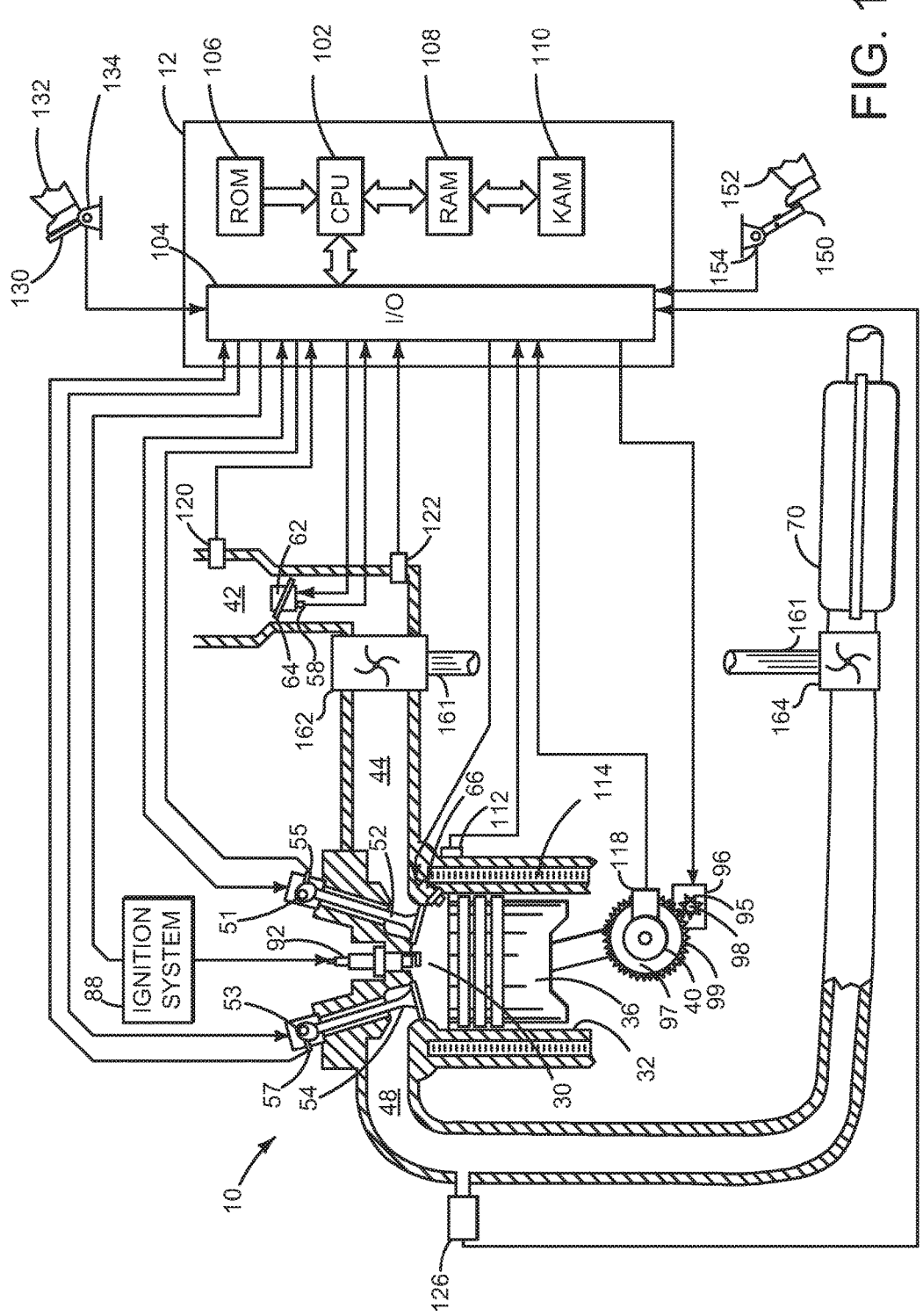
FIG. 1 is a schematic diagram of an engine.
Figure 2:
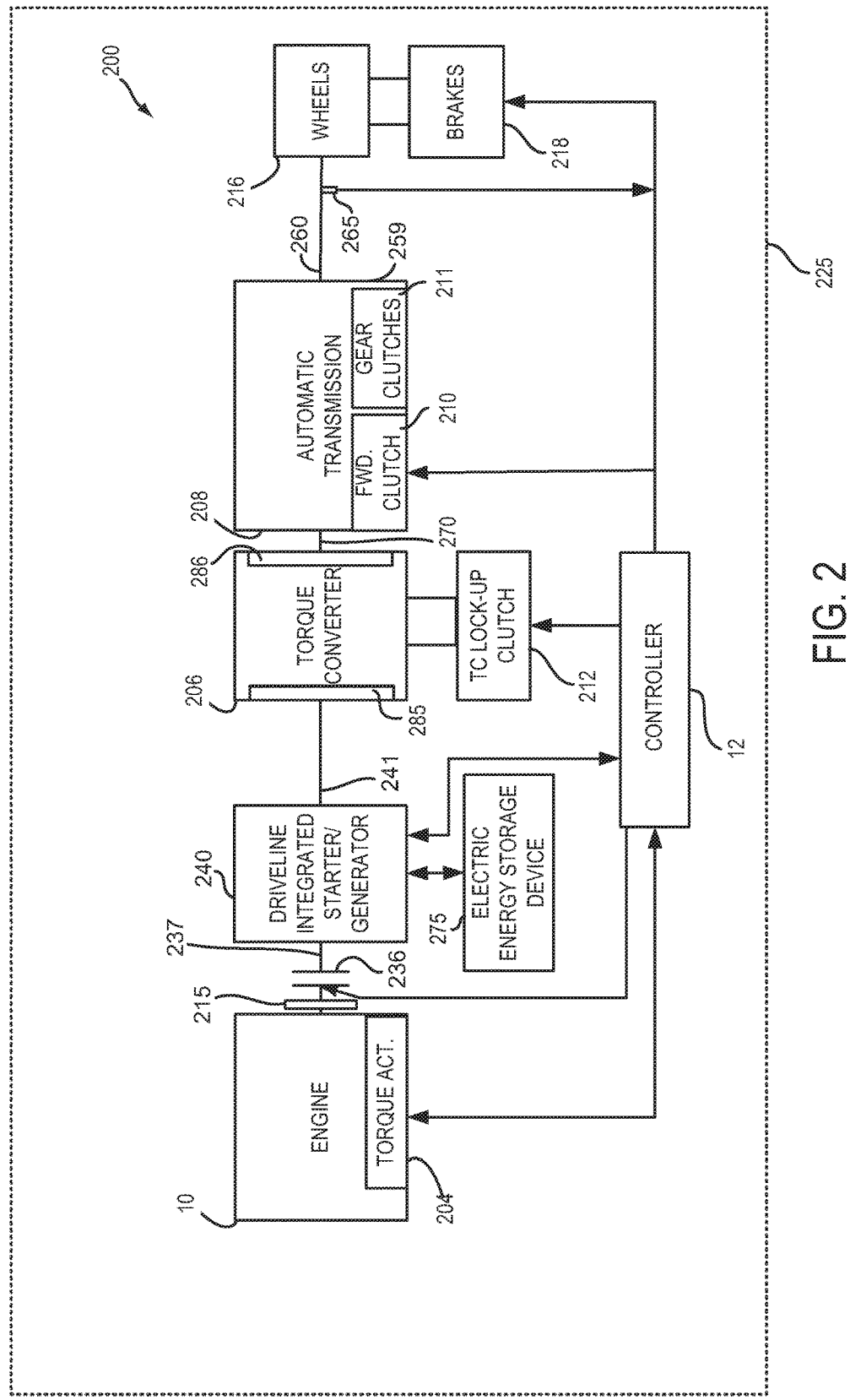
FIG. 2 shows an example vehicle driveline configuration.
Figure 3:
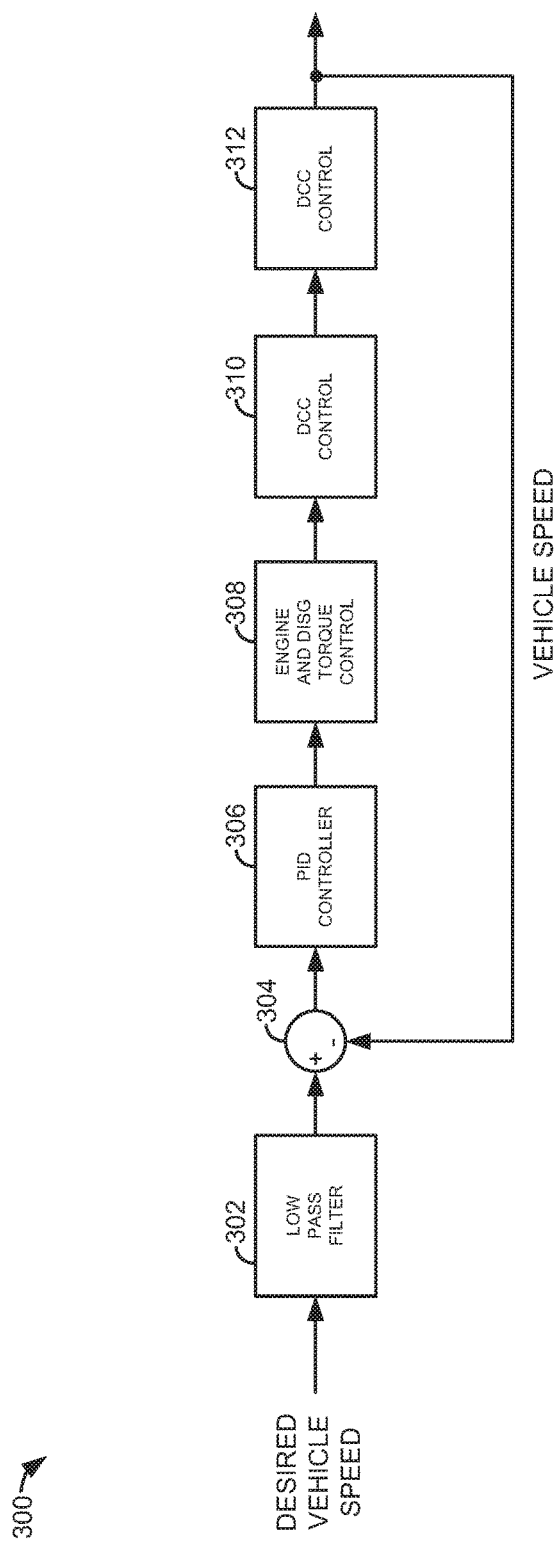
FIG. 3 shows an example vehicle speed controller block diagram.
Figure 4:
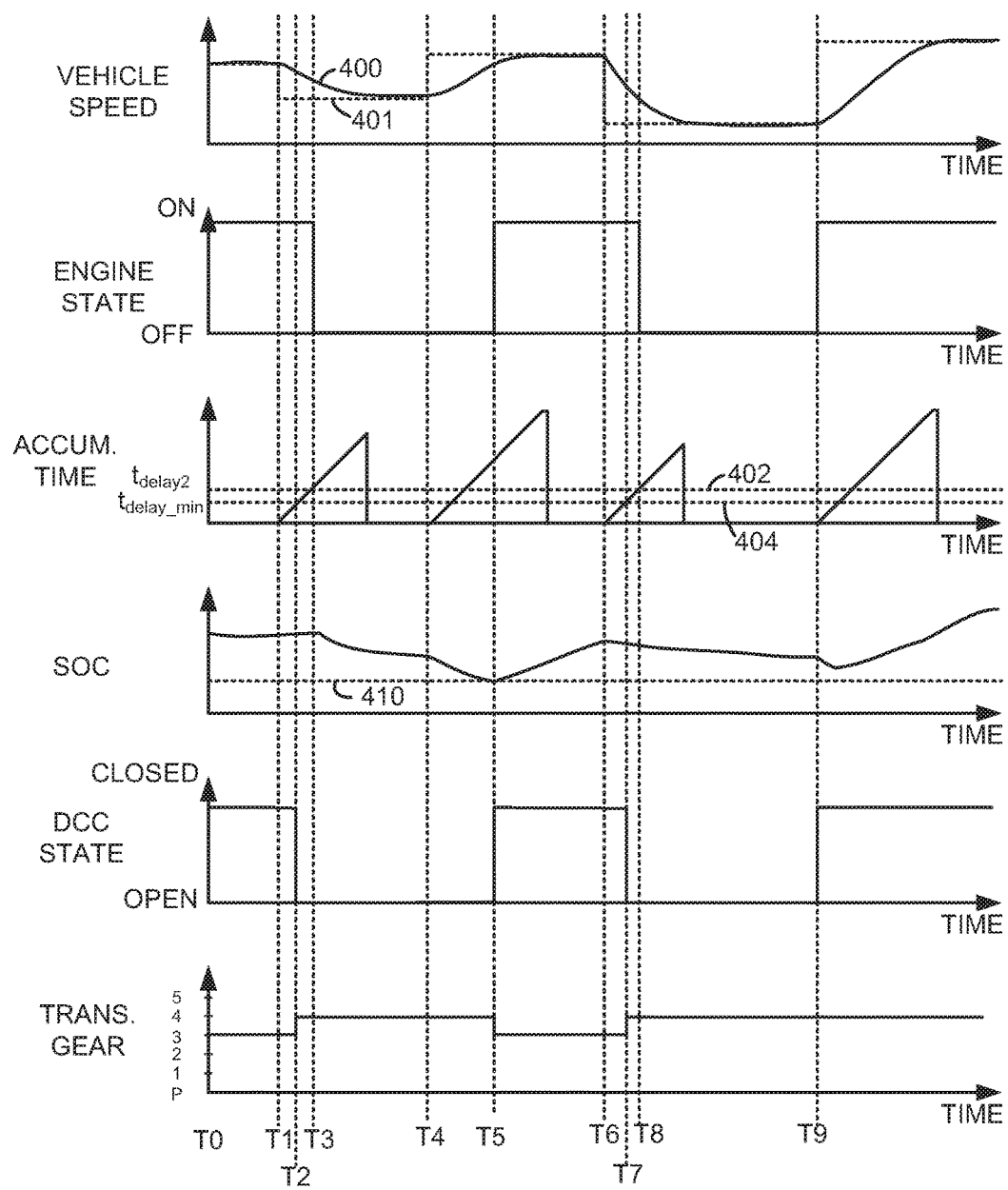
FIG. 4 shows an example hybrid vehicle operating sequence.

The present description is related to operating a hybrid vehicle in a cruise or speed control mode. The hybrid vehicle may include an engine as is shown in FIG. 1. The engine may be included in a driveline as is shown in FIG. 2. Further, the hybrid vehicle may include a vehicle cruise or speed controller as is shown in FIG. 3. The driveline may be operated as shown in FIG. 4 during speed control mode to reduce driveline mode change busyness. In particular, an actual total number of driveline mode changes during a change from a first vehicle speed to a second vehicle speed while the hybrid vehicle is in a closed-loop vehicle speed control mode may be reduced according to the method of FIGS. 5A-5C.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through optional dual mass flywheel 215. Thus, the engine is directly coupled to the driveline disconnect clutch 236 without intermediate gears or devices. The dual mass flywheel may include masses and springs that operate as a mechanical damper. Therefore, the duel mass flywheel may be described as a dampening flywheel as opposed to flywheels that to not include springs and that are not described as dampening flywheels. Flywheels that do not include springs may also be referred to as non-dampening flywheels even though the flywheel inertia may provide a small amount of dampening to the driveline. In some example driveline configurations, dual mass flywheel 215 may be absent or it may have a reduced mass made possible via driveline clutch torque capacity control. Disconnect clutch 236 may be electrically or hydraulically actuated. The downstream side of disconnect clutch 236 is shown mechanically coupled to DISG input shaft 237. Thus, the disconnect clutch 236 is directly coupled to the DISG 240 without intermediate gears or devices.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is directly mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure. Vehicle speed sensor 265 provides driveline position or wheel position data for determining vehicle speed.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIGS. 1 and 2 provides for a system for a hybrid vehicle, comprising: an engine; a driveline integrated starter generator (DISG); a driveline disconnect clutch mechanically coupled to the engine and the DISG; a transmission; and a controller including instructions to change from a first driveline mode to a second driveline mode in response to an estimate of a time to change from a present vehicle speed to a new vehicle speed while the hybrid vehicle is operating in a closed-loop vehicle speed control mode. The system includes where the first mode is an engine only mode and where the second mode is a DISG only mode. The system further comprises additional instructions close the driveline disconnect clutch in response to the estimate of time to change from the present vehicle speed to the new vehicle speed.

In some examples, the system further comprises additional instructions to upshift the transmission in response to DISG speed being greater than a DISG speed where maximum DISG torque is available. The system further comprises additional instructions to operate the engine in a deceleration fuel shut off mode in response to the time to change from the present vehicle speed to the new vehicle speed. The system further comprising additional instructions to delay the change from the first driveline mode to the second driveline mode in response to a time since a change from a first desired vehicle speed to a second desired vehicle speed.

Referring now to FIG. 3, a block diagram of an example hybrid vehicle speed control system is shown. Vehicle speed or cruise control system 300 receives a desired vehicle speed from a driver or a controller. The desired vehicle speed is passed through a low pass filter to smooth changes between different desired vehicle speeds that may be requested at different times. Actual vehicle speed is subtracted from the filtered desired vehicle speed at summing junction 304. An error value is output from summing junction 304 and input into proportional, integral, and derivative (PID) controller 306. The error is multiplied by proportional, integral, and derivative gains. The resulting values are added together and supplied to the engine and DISG torque controller 308.

The engine and DISG torque controller 308 allocates a fraction of the output from the PID controller to control engine torque and the remaining fraction to control DISG torque. The DISG and engine may be operated together in an engine/DISG mode, in an engine only mode where the engine is the only torque source for the driveline, or in a DISG only mode where the DISG is the only torque source for the driveline. The engine and DISG may provide positive or negative torque to the driveline. The driveline disconnect clutch (DCC) is opened and closed by the driveline disconnect clutch controller 310. For example, if the driveline is in engine only mode, the disconnect clutch is closed so that engine torque may be provided to the transmission and vehicle wheels. On the other hand, if the driveline is in DISG only mode, the disconnect clutch is held open. If the engine and DISG are operating together (e.g., both providing positive torque to the driveline or the engine providing positive torque and the DISG absorbing torque, or both the engine and DISG are providing negative torque to the driveline), the driveline disconnect clutch is closed to mechanically couple the engine and the DISG. The engine and DISG torque may result in generating a vehicle speed which is fed back to summing junction 304.

Referring now to FIG. 4, an example hybrid vehicle operating sequence is shown. The sequence of FIG. 4 may be provided by the system of FIGS. 1 and 2 executing the method of FIG. 5A-5C stored as instructions in non-transitory memory. The vertical lines at T1-T9 represent particular time of interest during the sequence. During the entire sequence of FIG. 4, the hybrid vehicle is operating in a closed-loop speed control mode where vehicle speed is controlled to the desired vehicle speed.

The first plot from the top of FIG. 4 is a plot of vehicle speed versus time. The Y axis represents vehicle speed and vehicle speed increases in the direction of the Y axis arrow. The X axis represents time and time increases from the left to right side of the figure. Solid line 400 represents actual vehicle speed. Dashed line 401 represents desired vehicle speed. Actual vehicle speed and desired vehicle speed are equal when only solid line 400 is visible.

The second plot from the top of FIG. 4 is a plot of engine state versus time. The Y axis represents engine state and the engine may be off when not combusting air-fuel mixtures and on when combusting air-fuel mixtures. The engine is on when the trace is near the Y axis arrow. The engine is off when the trace is at a level near the X axis. The X axis represents time and time increases from the left to right side of the figure.

The third plot from the top of FIG. 4 is a plot of accumulated time since a change in desired vehicle speed versus time. The Y axis represents the accumulated time since a change in desired vehicle speed and the accumulated time since a change in desired vehicle speed increases in the direction of the Y axis arrow. The accumulated time since a change in desired vehicle speed resets to zero when the new vehicle speed is achieved. The X axis represents time and time increases from the left to right side of the figure. Horizontal line 402 represents a minimum time delay $t_{delay\_min}$ for some driveline mode changes. Horizontal line 404 represents a predetermined driveline mode change time delay $t_{delay2}$ for some driveline mode changes.

The fourth plot from the top of FIG. 4 is a plot of battery state of charge (SOC) versus time. The Y axis represents SOC and SOC increases in the direction of the Y axis. The X axis represents time and time increases from the left to right side of the figure. Battery state of charge may range from zero to one hundred where zero is zero charge stored and where one hundred is the battery being charged to full rated capacity. Horizontal line 410 represents a lower SOC limit $SOC_{LIM}$ below which the engine remains operating or is started.

The fifth plot from the top of FIG. 4 is a plot of driveline disconnect clutch (DCC) operating state versus time. The Y axis represents DCC state and the DCC is open when the trace is at a lower level near the X axis. The DCC is closed when the trace is near the level of the Y axis arrow. The X axis represents time and time increases from the left to right side of the figure.

The sixth plot from the top of FIG. 4 is a plot of transmission gear versus time. The Y axis represents transmission gear and respective transmission gears are labeled along the Y axis (e.g., P represents park). The transmission is engaged in a gear when the trace is at the gear level shown along the Y axis. The X axis represents time and time increases from the left to right side of the figure.

At time T0, the hybrid vehicle is operating in a closed-loop speed control mode where vehicle speed is controlled to the desired vehicle speed 401. The actual vehicle speed 400 is at the desired vehicle speed 401 and the engine is combusting air and fuel. The accumulated time since a change in desired vehicle speed is zero and the SOC is at a higher level. The DCC is closed and the transmission is operating in third gear.

At time T1, the driver requests a change in vehicle speed from a higher vehicle speed to a lower vehicle speed as indicated by trace 401. The engine continues to operate and the accumulated time since the requested change in vehicle speed begins to increase. The SOC remains high and the DCC remains closed. The transmission continues to operate in third gear.

At time T2, the accumulated time since the request to change vehicle speed exceeds $t_{delay\_min}$. Further, the road load torque at the second vehicle speed (not shown) is determined to be less than maximum DISG torque $T_{DISG\_MAX}$. The SOC is greater than $SOC_{MIN}$ and the estimated time to change from the first vehicle speed (present vehicle speed) to the second vehicle speed (new vehicle speed) ($\Delta t_{spd\_chg}$) is greater than a predetermined time $t_{21\_minhi}$ (not shown). Therefore, the transmission is upshifted to a higher gear to reduce DISG speed to a speed below base DISG speed, a speed below which maximum DISG torque is available. Further, the DCC is opened to allow engine speed to vary from DISG speed. In this example, engine speed changes to idle speed (not shown).

At time T3, the accumulated time since the request to change vehicle speed exceeds $t_{delay2}$ and all the other conditions described at time T2 are present. Consequently, the engine is stopped at zero speed by stopping spark and fuel to the engine. The vehicle speed declines to the new desired vehicle speed since less torque is provided to the driveline by the engine and DISG. The accumulated time since the request to change vehicle speed is reset to zero when the vehicle speed reaches the new desired vehicle speed.

At time T4, the driver requests a change in vehicle speed from a lower vehicle speed to a higher vehicle speed as indicated by trace 401. The DISG provides torque to the driveline (not shown) and the accumulated time since the requested change in vehicle speed begins to increase. The SOC remains high and the DCC remains open. The transmission continues to operate in fourth gear. The road load torque at the second or new vehicle speed (not shown) is less than the maximum wheel torque that may be provided by the DISG (not shown). Further, the estimated time to change from the first or present vehicle speed to the new or second vehicle speed via only DISG torque ($\Delta t_{spd\_chg\_DISG}$) is less than a threshold time ($t_{up\_max1}$). Therefore, the engine is not started.

At time T5, the road load torque at the second or new vehicle speed (not shown) is less than the maximum wheel torque that may be provided by the DISG (not shown). Additionally, the estimated time to change from the first or present vehicle speed to the new or second vehicle speed via only DISG torque ($\Delta t_{spd\_chg\_DISG}$) is greater than a threshold time ($t_{up\_max1}$). However, the SOC is less than $SOC_{MIN}$ threshold 410. Therefore, the DCC is closed, the transmission is downshifted to a lower gear, and the engine is started. The engine accelerates to the DISG speed and begins to transfer positive torque to the driveline.

At time T6, the driver requests a change in vehicle speed from a higher vehicle speed to a lower vehicle speed as indicated by trace 401. The engine continues to operate and the accumulated time since the requested change in vehicle speed begins to increase. The SOC remains high and the DCC remains closed. The transmission continues to operate in third gear.

At time T7, the accumulated time since the request to change vehicle speed exceeds $t_{delay\_min}$. In addition, the road load torque at the second vehicle speed (not shown) is determined to be less than maximum DISG torque $T_{DISG\_MAX}$. The SOC is greater than $SOC_{MIN}$ and the estimated time to change from the first vehicle speed (present vehicle speed) to the second vehicle speed (new vehicle speed) ($\Delta t_{spd\_chg}$) is greater than a predetermined time $t_{21\_minhi}$ (not shown). Consequently, the transmission is upshifted to a higher gear to reduce DISG speed to a speed below base DISG speed, a speed below which maximum DISG torque is available. Also, the DCC is opened to allow engine speed to vary from DISG speed. In this example, engine speed changes to idle speed (not shown).

At time T8, the accumulated time since the request to change vehicle speed exceeds $t_{delay2}$ and all the other conditions described at time T7 are present. Therefore, the engine is stopped at zero speed by stopping spark and fuel to the engine. The vehicle speed declines to the new desired vehicle speed since less torque is provided to the driveline by the engine and DISG. The accumulated time since the request to change vehicle speed is reset to zero when the vehicle speed reaches the new desired vehicle speed.

At time T9, the driver requests a change in vehicle speed from a lower vehicle speed to a higher vehicle speed as indicated by trace 401. The DISG provides torque to the driveline (not shown) and the accumulated time since the requested change in vehicle speed begins to increase. The SOC remains high and the DCC remains open. The transmission continues to operate in third gear. The road load torque at the second or new vehicle speed (not shown) is less than the maximum wheel torque that may be provided by the DISG (not shown). However, the estimated time to change from the first or present vehicle speed to the new or second vehicle speed via only DISG torque ($\Delta t_{spd\_chg\_DISG}$) is greater than a threshold time ($t_{up\_max1}$). Therefore, the engine is started in response to the request to change vehicle speed from the first (lower) vehicle speed to the second (higher) vehicle speed. As a result, the engine is restarted sooner so that the battery is not discharged and so that the vehicle accelerates at a desired rate.

In this way, shifting between driveline operating modes may be delayed based on a combination of time to change from a first vehicle speed to a second vehicle speed, SOC, road load torque, maximum DISG torque, and time since a request to change vehicle speeds was initiated. Consequently, mode change busyness may be reduced.

Figure 5A:
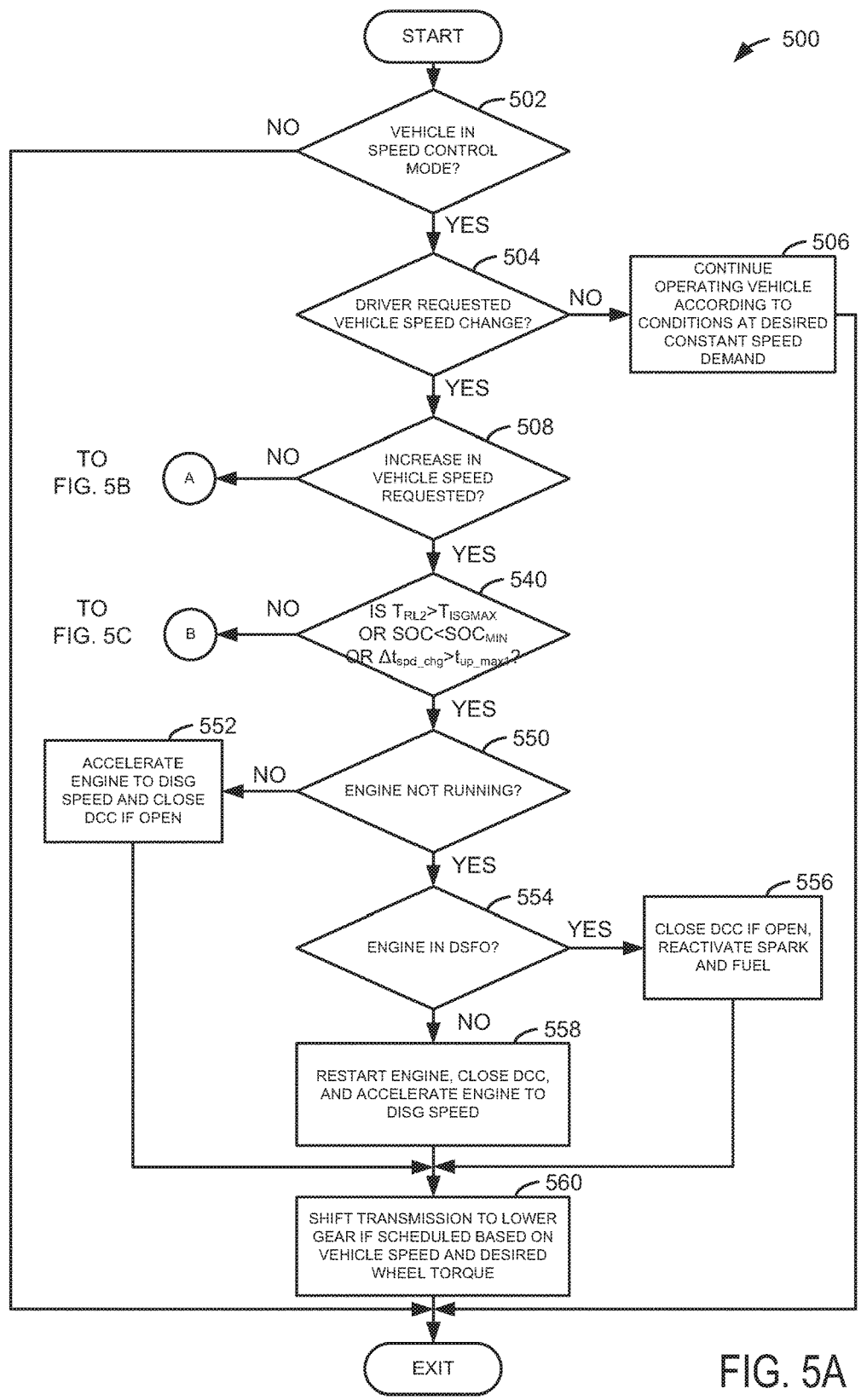
FIGS. 5A-5C show an example method for operating a hybrid vehicle driveline.
Figure 5B:
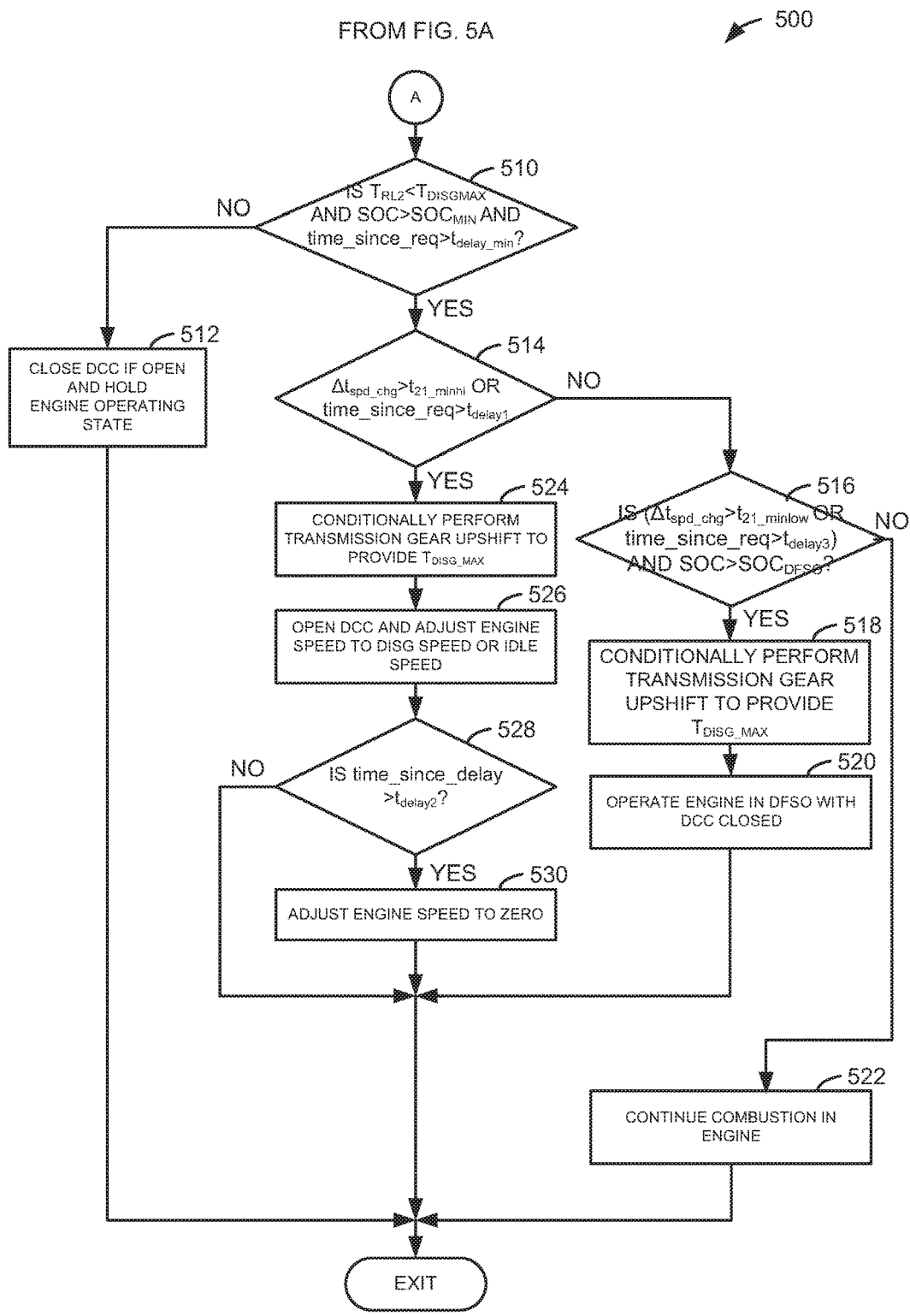
Figure 5C:
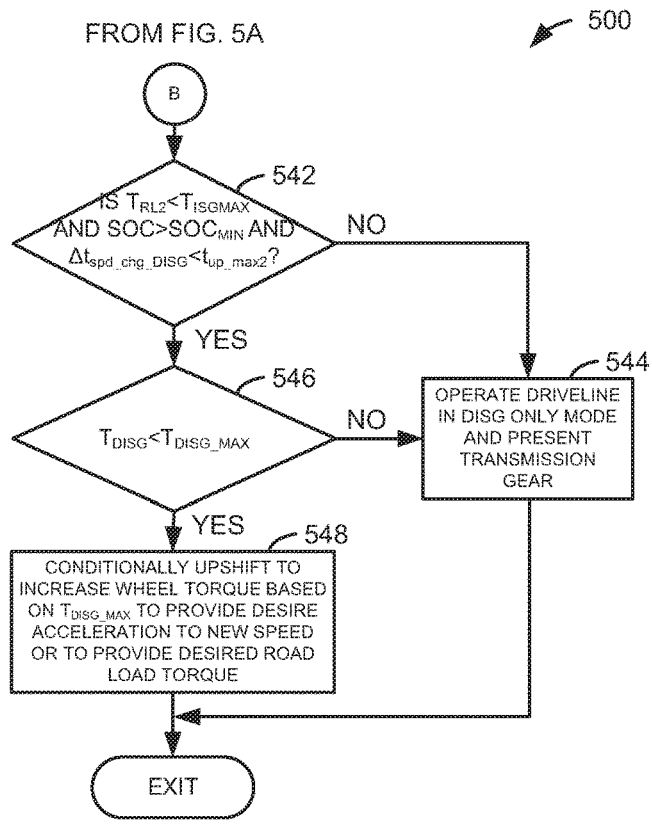

Referring now to FIGS. 5A-5C, a method for operating a hybrid vehicle driveline is shown. The method of FIGS. 5A-5C may be included in the system of FIGS. 1 and 2 as executable instructions stored in non-transitory memory. Additionally, the method of FIGS. 5A-5C may provide the operating sequence shown in FIG. 4.

At 502, method 500 judges if the hybrid vehicle is in a speed control or cruise control mode. The vehicle may enter speed control mode in response to an operator or controller request. During speed control mode, the driver or controller requests a desired vehicle speed. The engine and/or DISG torque is adjusted to provide the desired vehicle speed. In particular, the engine and/or DISG torque is adjusted in response to a difference in desired vehicle speed and actual vehicle speed. Thus, engine and/or DISG torque is varied to maintain vehicle speed at a desired speed. If method 500 judges that the vehicle is in speed control mode, the answer is yes and method 500 proceeds to 504. Otherwise, the answer is no and method 500 exits.

At 504, method 500 judges if a driver or controller has request a change in vehicle speed from a present vehicle speed to a new vehicle speed. If the desired vehicle speed has changed, the answer is yes and method 500 proceeds to 508. Otherwise, the answer is no and method 500 proceeds to 506.

At 506, method 500 continues to operate the vehicle driveline according to vehicle conditions while maintaining the desired vehicle speed. Further, the driveline operating modes may remain the same or the driveline may change modes in response to vehicle conditions such as battery state of charge and vehicle road grade. The engine and/or DISG torque may be adjusted to maintain the vehicle speed at the desired vehicle speed. For example, if road grade is increasing, engine and/or DISG torque may be increased to maintain the desired vehicle speed. Method 500 proceeds to exit after engine and/or DISG torque and driveline operating modes are adjusted in response to vehicle operating conditions.

At 508, method 500 judges if the requested vehicle speed change is an increase in the requested vehicle speed. Method 500 may judge that the change in vehicle speed is an increase in vehicle speed when the new requested vehicle speed is greater than the present vehicle speed. If method 500 judges that the requested change in vehicle speed is an increase in vehicle speed, torque is provided by the engine and/or DISG to the driveline to increase vehicle speed. Further, the answer is yes and method 500 proceeds to 540. Otherwise, if the requested change in vehicle speed is a decrease in vehicle speed, the engine and/or DISG torque may be decreased to decrease vehicle speed. Additionally, the answer is no and method 500 proceeds to 510.

At 510, method 500 judges vehicle operating conditions to determine operating states of driveline components that may be desirable for decelerating the vehicle. Road grade and available DISG torque at the present DISG speed are two parameters that may affect driveline efficiency and performance. The amount of available DISG torque varies with DISG speed. At DISG speeds below a base DISG speed, the DISG has a maximum torque capacity. At DISG speed greater than the base DISG speed, the DISG provides a constant maximum power. However, since DISG power is DISG speed multiplied by DISG torque, DISG torque decreases as DISG speed increases at DISG speeds greater than the base DISG speed.

It may be desirable to define the relationship between vehicle acceleration, engine torque, and DISG torque to determine when it is desirable to change driveline operating modes in response to a request to accelerate or decelerate the vehicle. Vehicle acceleration may be expressed as:

$$M_{veh}A_{veh} = \frac{(T_{ENG} + T_{DISG}) - (T_{RL} + R_r \cdot M_{veh} \cdot g \cdot \sin(\theta))}{R_r} \quad \text{(Equation 1)}$$

where $M_{veh}$ is mass of the vehicle, $A_{veh}$ is vehicle acceleration, $T_{ENG}$ is engine torque, $T_{DISG}$ is DISG torque, $T_{RL}$ is road load torque, $R_r$ is wheel rolling radius, g is gravity constant, and θ is the road angle. Assuming vehicle acceleration is near zero at a time of a requested vehicle speed change, road load torque at the first (e.g., present) vehicle speed and second (e.g., new) vehicle speed are given by:

$$T_{RL1} = (T_{ENG} + T_{DISG})|_{V_{spd1},gear1,\theta} = \quad \text{(Equation 2)}$$
$$(T_{RL}|_{V_{spd1},gear1} + R_r M_{veh} g \sin(\theta))$$

$$T_{RL2} = (T_{ENG} + T_{DISG})|_{V_{spd2},gear2,\theta} = \quad \text{(Equation 3)}$$
$$(T_{RL}|_{V_{spd2},gear2} + R_r M_{veh} g \sin(\theta))$$

where $T_{RL1}$ is the road load torque at the present vehicle speed, $T_{RL2}$ is the road load torque at the new vehicle speed; $T_{RL1}$ being evaluated at the present vehicle speed ($V_{spd1}$), the present engaged transmission gear ratio (gear1), and road angle θ; $T_{RL2}$ being evaluated at the present vehicle speed ($V_{spd2}$), the present engaged transmission gear ratio (gear2), and road angle θ.

The time to transition from a first vehicle speed to a second vehicle speed may be determined by:

$$\Delta t_{spd\_chg} = \left| \frac{V_{spd1} - V_{spd2}}{A_{veh\_des\_ave}} \right| \quad \text{(Equation 4)}$$

where $\Delta t_{spd\_chg}$ is the time to transition from the first vehicle speed to the second vehicle speed, and where $A_{veh\_des\_ave}$ is an average desired vehicle acceleration rate. The average desired vehicle acceleration rate may be empirically determined and stored in memory for later retrieval and use. The change in wheel torque is given by:

$$\Delta T_{wh} = R_r M_{veh} A_{veh\_des\_ave} \quad \text{(Equation 5)}$$

where $\Delta T_{wh}$ is the change in wheel torque for the change in vehicle speed from the first vehicle speed to the second vehicle speed.

Equations 2, 3, and 5 may be combined to obtain the average torque increase or decrease for changing the vehicle speed from the first vehicle speed to the second vehicle speed, the average torque is given by:

$$T_2 = (T_{ENG} + T_{DISG})|_{V_{spd2},gear2,\theta} + R_r M_{veh} A_{veh\_des\_ave} \quad \text{(Equation 6)}$$

where $T_2$ is the average torque to move the vehicle to the second vehicle speed. Because a change in torque is the basis for changing vehicle speed, it may be observed that a driveline mode controller that relies primarily on driveline torque to determine driveline mode may exhibit driveline mode change busyness.

Driveline mode change busyness (e.g., frequently changing between driveline operating modes) may be reduced by judging whether or not to change driveline modes based on additional parameters. Specifically, at 510, method 500 judges if the road load torque at the second or new desired vehicle speed ($T_{RL2}$) is less than the maximum DISG torque (e.g., maximum DISG torque below the base speed) $T_{DISGMAX}$ and SOC is less than a predetermined minimum SOC ($SOC_{MIN}$) and a time since the vehicle speed change request (time_since_req) is greater than a predetermined minimum time ($t_{delay\_min}$). If so, the answer is yes and method 500 proceeds to 514. Otherwise, the answer is no and method 500 proceeds to 512.

At 512, method 500 closes the DCC if the DCC is open and holds the engine's present operating state active. For example, if the engine is combusting air and fuel, it continues to do so. Method 500 proceeds to 532 after closing the DCC and holding the engine's present operating state.

At 514, method 500 judges if the estimated time to change vehicle speed from the first vehicle speed, in this case a higher vehicle speed, to a second vehicle speed, in this case a lower vehicle speed ($\Delta_{spd\_chg}$), is greater than a predetermined time ($t_{21\_minhi}$) or time since the request to change from the first speed to the second speed (time_since_req) is greater than a threshold amount of time $t_{delay1}$, $t_{delay1}$ being greater than $t_{delay\_min}$. If so, the answer is yes and method 500 proceeds to 524. Otherwise, the answer is no and method 500 proceeds to 516.

At 516, method 500 judges if the estimated time to change vehicle speed from the first vehicle speed to the second vehicle speed ($\Delta t_{spd\_chg}$) is greater than a predetermined time ($t_{21\_minilow}$) or time since the request to change from the first speed to the second speed (time_since_req) is greater than a threshold amount of time $t_{delay3}$, $t_{delay3}$ being less than $t_{delay1}$. A logical and operation is then performed on the logical result and whether SOC is greater than a battery state of charge based on engine deceleration fuel shut off mode ($SOC_{DFSO}$). If so, the answer is yes and method 500 proceeds to 518. Otherwise, the answer is no and method 500 proceeds to 522.

At 522, method 500 continues to operate the engine by allowing the engine to continue combusting air and fuel. Further, the DCC remains in a closed state so that the engine and DISG may provide torque to the driveline. Method 500 proceeds to exit after the engine continues to operate and the DCC is closed.

At 518, method 500 conditionally performs a transmission gear upshift with the engine combusting air and fuel to allow the DISG to provide the maximum DISG torque $T_{DISG\_MAX}$ (e.g., torque at a DISG speed less than the base DISG speed). For example, if the DISG is presently operating at a speed above a base speed where the DISG outputs a constant maximum power, the transmission may be shifted to a higher gear while the engine is combusting air and fuel so that the DISG speed may be reduced to a speed less than the DISG base speed below which maximum DISG torque is a constant maximum torque. Method 500 proceeds to 520 after the transmission is conditionally upshifted (e.g., shifted to a higher gear to reduce DISG speed, from $2^{nd}$ to $3^{rd}$ for example).

At 520, method 500 ceases supplying spark and fuel to engine cylinders and the DCC is closed or held closed. Engine torque may be made available more quickly when the engine is allowed to continue rotating. Further, engine fuel consumption is reduced when the engine is allowed to rotate without supplying fuel to the engine cylinders. Method 500 proceeds to exit after the engine enters DFSO and the DCC is closed.

Thus, 516 provides logic to determine if the engine should continue combusting air and fuel or enter deceleration fuel shut off mode (DSFO) where the engine rotates without spark and fuel with the DCC in a closed state. The determination being based on an estimated time to change from the first vehicle speed to the second vehicle speed and a time since the request to change from the first vehicle speed to the second vehicle speed was made.

At 524, method 500 conditionally performs a transmission gear upshift to allow the DISG to provide the maximum DISG torque ($T_{DISG\_MAX}$) (e.g., maximum DISG torque at a DISG speed less than the base DISG speed). Method 500 proceeds to 526 after the transmission is conditionally upshifted (e.g., shifted to a higher gear to reduce DISG speed, from $2^{nd}$ to $3^{rd}$ for example).

At 526, method 500 opens the DCC and adjusts engine speed to engine idle speed or to match DISG speed. Adjusting engine speed to idle allows fuel to be conserved. Adjusting engine speed to match DISG speed reduces an amount of time to recouple the engine to the DISG and provide positive torque to the vehicle's wheels. The engine speed may be adjusted to idle speed or match DISG speed based on operating conditions such as vehicle speed, road grade, and road load torque. Method 500 proceeds to 528 after the DCC is opened and engine speed is adjusted.

At 528, method 500 judges if the time since the request to change vehicle speed from the first speed to the second speed is greater than the threshold time $t_{delay2}$. If so, the answer is yes and method 500 proceeds to 530. Otherwise, the answer is no and method 500 proceeds to exit. The threshold time $t_{delay2}$ may be an amount of time greater than $t_{delay1}$ and $t_{delay\_min}$.

At 530, method 500 adjusts engine speed to zero by stopping spark and fuel flow to the engine. Stopping the engine may further conserve fuel by not consuming fuel at idle. Method 500 proceeds to exit after the engine is stopped.

At 540, method 500 judges if the road load torque at the second or new desired vehicle speed ($T_{RL2}$) is greater than the maximum DISG torque (e.g., maximum DISG torque below the base speed) $T_{DISGMAX}$ or SOC is less than a predetermined minimum SOC ($SOC_{MIN}$) or the estimated time to change vehicle speed from the first vehicle speed to the second vehicle speed ($\Delta t_{spd\_chg}$) is greater than a predetermined time ($t_{up\_max1}$). If so, the answer is yes and method 500 proceeds to 550. Otherwise, the answer is no and method 500 proceeds to 542.

At 542, method 500 judges if the road load torque at the second or new desired vehicle speed ($T_{RL2}$) is less than the maximum DISG torque (e.g., maximum DISG torque below the base speed) $T_{DISGMAX}$ and SOC is greater than a predetermined minimum SOC ($SOC_{MIN}$) and the estimated time to change vehicle speed from the first vehicle speed to the second vehicle speed using only the DISG ($\Delta t_{spd\_chg\_DISG}$) is less than a predetermined time ($t_{up\_max2}$). If so, the answer is yes and method 500 proceeds to 546. Otherwise, the answer is no and method 500 proceeds to 544. The time to change vehicle speed from the first vehicle speed to the second vehicle speed using only the DISG is given by:

$$\Delta t_{spd\_chg\_DISG} = \left| \frac{V_{spd1} - V_{spd2}}{(T_{DISG\_MAX} - T_{RL2}/(M_{veh}R_r)} \right|$$

At 544, method 500 operates the driveline in DISG only mode and the transmission remains in the present selected gear. The driveline may remain in the DISG only mode when the increase in vehicle speed is small and the DISG has torque to accelerate the vehicle to the new speed in less than a threshold amount of time. Method 500 proceeds to exit after operating the driveline in DISG only mode.

At 546, method 500 judges if the present DISG torque $T_{DISG}$ is less than the maximum DISG torque $T_{DISGMAX}$. If so, the answer is yes and method 500 proceeds to 548. Otherwise, the answer is no and method 500 proceeds to 544.

At 548, method 500 conditionally upshifts to increase wheel torque based on transmission input torque being at maximum DISG torque $T_{DISG\_MAX}$. The DISG torque may be increased to the maximum DISG torque in response to a desire to provide the desired acceleration or wheel torque. Method 500 proceeds to exit after the wheel torque is conditionally up shifted.

At 550, method 500 judges whether the engine is not running (e.g., combusting air and fuel). If the engine is not running, the answer is yes and method 500 proceeds to 554. Otherwise, the answer is no and method 500 proceeds to 552.

At 552, method 500 accelerates the engine to DISG speed and closes the DCC if the DCC is open. The engine is accelerated and the DCC closed to allow the engine to provide torque to the driveline to accelerate the vehicle from the first vehicle speed to the second vehicle speed. Thus, the engine and DISG may provide torque to the driveline to accelerate the vehicle to the new speed. Method 500 proceeds to exit after the engine is accelerated to DISG speed and engine torque is transferred to vehicle wheels.

At 554, method 500 judges whether or not the engine is in deceleration fuel shut off mode (DFSO). The engine rotates during DSFO, but spark and fuel are not provided to engine cylinders. If method 500 judges that the engine is being operated in DSFO, the answer is yes and method 500 proceeds to 556. Otherwise, the answer is no and method 500 proceeds to 558.

At 556, method 500 closes the DCC if the DCC is open and begins to supply spark and fuel to the engine so that the engine resumes combustion. The engine then provides torque to the transmission and vehicle's wheels to accelerate the vehicle to the new desired speed. Method 500 proceeds to exit after the DCC is closed and the engine is providing positive torque to the driveline.

At 558, method 500 restarts the engine, accelerates the engine to DISG speed, and closes the DCC. The engine may be restarted via a starter or via closing the DCC. The engine provides torque to the transmission and vehicle wheels to accelerate the vehicle to the new desired vehicle speed. Method 500 exits after the engine is started and providing positive torque to the wheels.

Thus, the conditional logic at 510 and other steps that include time parameters may provide a delay for switching between driveline modes. Further, during reductions in vehicle speed, the driveline may switch from engine only mode to DISG only mode. Likewise, during vehicle accelerations, the driveline may switch from DISG only mode to engine only mode. During some vehicle accelerations or decelerations, the driveline mode may change from engine only mode to engine and DISG mode and back to engine only mode.

Additionally, the method of FIGS. 5A-5C provides for a method, comprising: during a closed-loop vehicle speed control mode, delaying a change in propulsion sources providing torque to a driveline or absorbing torque from the driveline in response to an amount of time since a change in a desired vehicle speed. The method includes where the change in desired vehicle speed is a decrease in vehicle speed. The method includes where the change in propulsion sources is from an engine only operating mode to a driveline integrated starter/generator only mode. The method further comprising delaying the change in propulsion sources providing torque to the driveline in further response to an estimated time to change vehicle speed from a present speed to a new speed.

In some examples, the method further comprises delaying an engine deactivation time in response to the amount of time since the change in the desired vehicle speed. The method further comprises upshifting a transmission in response to the amount of time since the change in the desired vehicle speed. The method further comprises delaying entering an engine into a deceleration fuel shut off mode where a driveline disconnect clutch is closed in response to a time since the change in the desired vehicle speed.

The method of FIGS. 5A-5C also comprises: during a closed-loop vehicle speed control mode, delaying a change in propulsion sources providing torque to a driveline or absorbing torque from the driveline in response to an estimate of a time to change from a present vehicle speed to a new vehicle speed. The method includes where the new vehicle speed is greater than the present vehicle speed. The method includes where the new vehicle speed is less than the present vehicle speed. The method further comprises delaying opening a driveline disconnect clutch in response to the estimate of the time change from the present vehicle speed to the new vehicle speed. The method includes where the closed-loop vehicle speed control mode adjusts vehicle speed based on a difference between a desired vehicle speed and an actual vehicle speed.

In some examples, the method further comprises upshifting a transmission to adjust speed of a driveline integrated starter/generator (DISG) to a speed where maximum DISG torque is available in response to the estimate of time to change from the present vehicle speed to the new vehicle speed. The method further comprises delaying opening of a driveline disconnect clutch in response to the time to change from the present vehicle speed to the new vehicle speed.

As will be appreciated by one of ordinary skill in the art, the methods described in FIGS. 5A-5C may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
starting a stopped engine and closing a driveline disconnect clutch via a controller in response to an estimated time to change from a present vehicle speed to a new vehicle speed being greater than a predetermined amount of time during a closed-loop vehicle speed control mode.

2. The method of claim 1, where the new vehicle speed is greater than the present vehicle speed, and further comprising delaying a change in propulsion sources via delaying actuation of the driveline disconnect clutch mechanically coupled to the engine and a driveline integrated starter/generator.

3. The method of claim 1, where the new vehicle speed is less than the present vehicle speed.

4. The method of claim 1, further comprising shifting a transmission to a new gear in response to the estimated time to change from the present vehicle speed to the new vehicle speed.

5. The method of claim 1, where the closed-loop vehicle speed control mode adjusts vehicle speed based on a difference between a desired vehicle speed and an actual vehicle speed.

6. The method of claim 1, where the closed-loop vehicle speed control mode includes a proportional/integral controller.

7. The method of claim 1, where the driveline disconnect clutch is mechanically coupled to the engine and a driveline integrated starter/generator, and wherein the engine is in a hybrid vehicle.

* * * * *